United States Patent
Shemer et al.

(10) Patent No.: US 10,936,424 B1
(45) Date of Patent: Mar. 2, 2021

(54) SMART FILE LEVEL RESTORE WITH RP4VM

(71) Applicant: EMC IP Holding Company LLC, Hopkinton, MA (US)

(72) Inventors: Jehuda Shemer, Kfar Saba (IL); Alex Solan, Tel Aviv (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 14 days.

(21) Appl. No.: 16/557,766

(22) Filed: Aug. 30, 2019

(51) Int. Cl.
 G06F 11/14 (2006.01)
 G06F 11/07 (2006.01)

(52) U.S. Cl.
 CPC ...... *G06F 11/1448* (2013.01); *G06F 11/0793* (2013.01); *G06F 11/1438* (2013.01); *G06F 11/1484* (2013.01)

(58) Field of Classification Search
 CPC ............. G06F 11/0793; G06F 11/1435; G06F 11/1448; G06F 11/1484
 See application file for complete search history.

(56) References Cited

U.S. PATENT DOCUMENTS

| 7,039,663 | B1* | 5/2006 | Federwisch | G06F 11/1451 |
| 7,225,204 | B2* | 5/2007 | Manley | G06F 11/2066 707/639 |
| 8,606,751 | B1* | 12/2013 | Starling | G06F 11/1458 707/634 |
| 10,037,251 | B1* | 7/2018 | Bono | G06F 11/2097 |
| 10,496,601 | B1* | 12/2019 | Natanzon | G06F 3/0685 |

\* cited by examiner

*Primary Examiner* — Joseph R Kudirka
(74) *Attorney, Agent, or Firm* — Womble Bond Dickinson (US) LLP (57) ABSTRACT

A method, apparatus, and system for recreating a file that corresponds to a specified point in time (PiT) in a data storage system is disclosed. The particular PiT and the name of the file to be restored may be received from a user. A file system inode structure corresponding to the particular PiT may be recreated based on an inode event stream stored in a journal. One or more disk locations associated with the file to be restored may be determined based on the inode structure corresponding to the particular PiT. A temporary file may be constructed with data read from the one or more disk locations in a storage system of the backup site. Thereafter, the file to be restored may be obtained, which may comprise rolling back data of the temporary file to the particular PiT based on a data stream stored in the journal.

21 Claims, 6 Drawing Sheets

SMART FILE LEVEL RESTORE WITH RP4VM

FIELD OF THE INVENTION

Embodiments of the present disclosure relate generally to data storage systems. More particularly, embodiments of the invention relate to data replication, storage, and protection in data storage systems.

BACKGROUND

Computer data is vital to today's organizations, and a significant part of protection against disasters is focused on data protection. Organizations operate with systems that store and process terabytes of data.

A conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time (PiT) within a recent history. Continuous data protection systems may enable recovery as close as possible to any specified PiT within a recent history.

Continuous data protection typically uses a technology referred to as "journaling," whereby a log is kept of changes made to the backup storage. During a recovery, the journal entries serve as successive "undo" information, enabling rollback of the backup storage to previous PiTs. Journaling was first implemented in database systems, and was later extended to broader data protection.

With the PiT replication technology, when a minor data disaster, such as corruption or accidental deletion of one or several files, occurs, the relevant virtual machine (VM) (in particular, the VM disk image) can be restored to a PiT prior to the corruption. However, to restore the whole VM is a lengthy procedure, which involves the user configuring the restoration and the system recreating the VM that corresponds to the required PiT.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

To restore the whole VM is a lengthy procedure, which involves the user configuring the restoration and the system recreating the VM that corresponds to the required PiT.

Embodiments of the disclosure relate to a method, apparatus, and system for recreating an individual file that corresponds to a specified PiT in a data storage system. The method can be extended to the recreation of several files, a directory, or a whole file system. In particular, first, the particular PiT and the name of the file to be restored that corresponds to the particular PiT may be received. A file system inode structure corresponding to the particular PiT may be recreated based on an inode event stream stored in a journal at a backup site. One or more disk locations associated with the file to be restored corresponding to the particular PiT may be determined based on the file system inode structure corresponding to the particular PiT. A temporary file may be constructed with data corresponding to a current time read from the one or more disk locations in a storage system of the backup site. Thereafter, the file to be restored may be obtained, which may comprise rolling back data of the temporary file from the current time to the particular PiT based on a data stream stored in the journal at the backup site.

In one embodiment, the inode event stream stored in the journal at the backup site may comprise a plurality of inode events captured by a file system agent in a virtual machine (VM) at a production site and transmitted over time from the production site to the backup site for journaling.

In one embodiment, the data stream stored in the journal at the backup site may comprise a plurality of storage data writes captured by a splitter at the production site and transmitted over time from the production site to the backup site for backup storage and journaling.

In one embodiment, the inode event stream may comprise one or more file system inode structures corresponding to past PiTs.

In one embodiment, recreating the file system inode structure corresponding to the particular PiT based on the inode event stream may comprise rolling forward a file system inode structure corresponding to an earlier PiT to the particular PiT. In one embodiment, the file system inode structure corresponding to the earlier PiT may be an initial file system inode structure.

In one embodiment, recreating the file system inode structure corresponding to the particular PiT based on the inode event stream may comprise rolling back a file system inode structure corresponding to a later PiT to the particular PiT.

Figure 1:
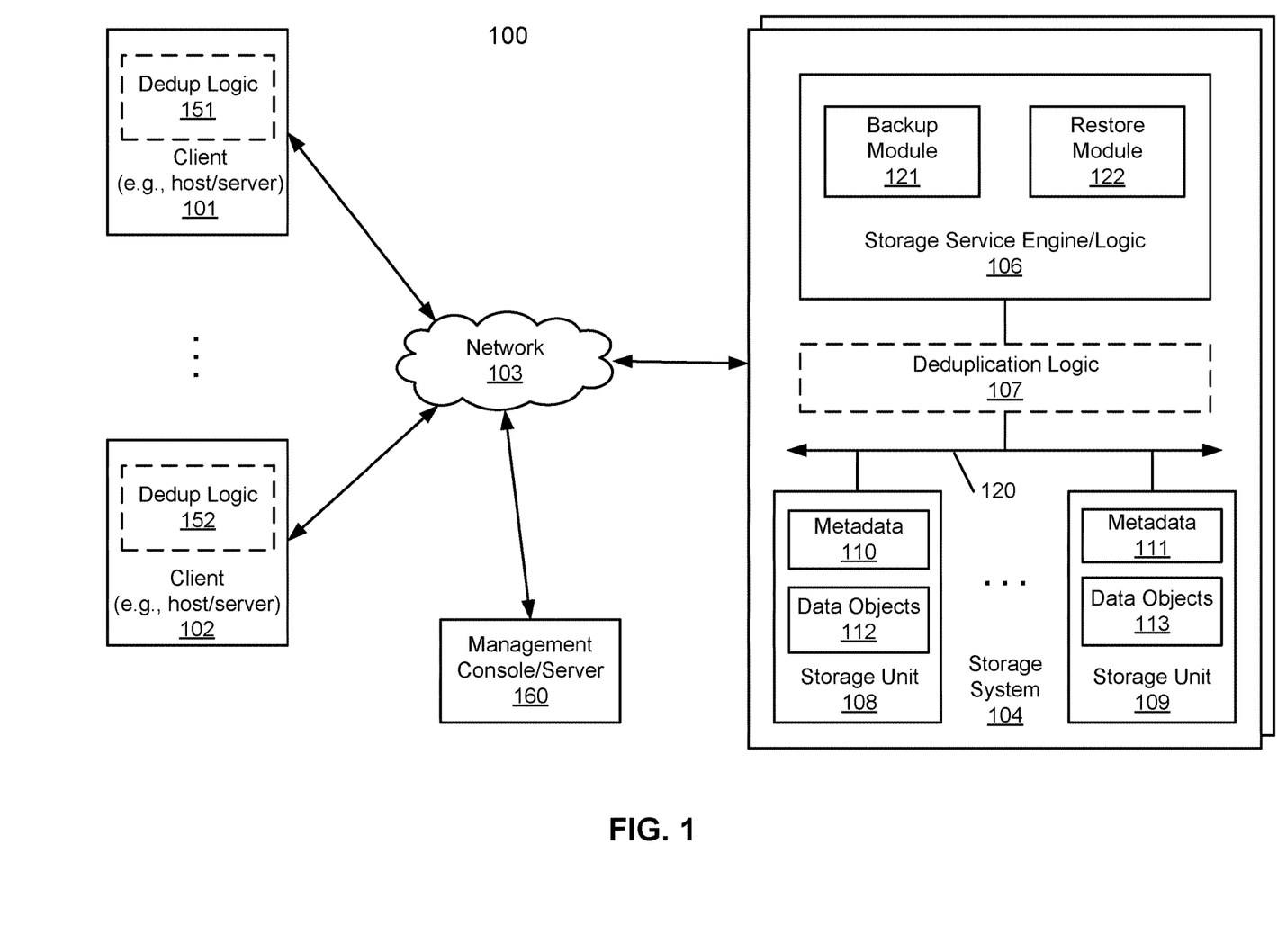
FIG. 1 is a block diagram illustrating a storage system according to one embodiment of the invention.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121 and restore logic 122. Backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

In one embodiment, storage system 104 further includes a storage manager or storage controller (not shown) configured to manage storage resources of storage system 104, such as, for example, storage space and processing resources (e.g., processor, memory, network resources). The storage manager or controller may be accessed by an administrator of management console or server 160 remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

A replicator replicates an original file system on a replicated file system. The replicated file system can be accessed by both the replicator and clients. To perform file replication, the replicator may create, delete or modify files on the replicated file system. In some embodiments, clients can read files on the replicated file system, but may not create, delete or modify files. In some embodiments, the replicator duplicates the replicated file system based on the original file system during initialization. In some embodiments, to efficiently initialize the replicated file system, the original file system is copied to the replicated file system via a network connection or using removable storage media such as backup tapes or optical storage discs.

In some embodiments, data segments included in the original file system are copied to the replicated file system via removable storage media and initialization is completed via the network. The replicator updates changes to the original file system on the replicated file system, keeping the two file systems synchronized. The replicator may be implemented as a process and/or device separate from the storage systems and/or file systems, a process and/or device that is a part of one or both of the storage systems and/or file system, or any other appropriate means. For example, in some embodiments, the replicator is a standalone device capable of communicating with the file systems. It determines the necessary updates by communicating with the original file system, and sends the updates to the replicated file system. The replicated file system is configured to answer queries, accept the updates, and modify the contents in the file system accordingly. In some embodiments, the replicator's functions are implemented as separate processes on the storage systems.

It is possible to represent files in other ways, such as using a mixture of byte sequences and references to byte sequences in other files. The byte sequences are treated as data segment. The identifiers used to reference the segments are substantially shorter than the segments themselves. Therefore, using identifiers allows more efficient use of available storage space. In some embodiments, the data segments and data segment identifiers are replicated on the replicated file system. In some embodiments, metadata of files are also updated. As used herein, metadata includes data associated with various attributes of the file, such as file name, file length, date stamp, permission, whether a file has been removed from the current file system, whether a file has been renamed, etc.

In some embodiment, only the files that have been updated or newly references are replicated. A file is deemed to have been updated if it has been modified in some way since the last replication, such as having been edited, created, renamed, deleted, had a permission change, etc. If the file has not been updated, nothing needs to be done to it in terms of replication. Any data segment that has been previously stored on the replicated file system, but is newly referenced by the file being processed is located. In some embodiments, a data segment is deemed to be newly referenced if it was not referenced by the file at the time of the last replication, as a data segment that has been added or modified since the last replication.

In some embodiments, a data segment is deemed to be newly referenced if it was never referenced by the file during the file's replication history, or was not referenced within some number of replications. A data segment may be previously stored on the replicated file system, but is still newly referenced by the file if the data segment was previously stored on the replicated file system by another file, by a client writing to the replicated file system, or by some other preloading/initialization mechanism. Since the data segments have been previously stored, they do not need to be replicated again on the replicated file system. Thus, greater efficiency in replication is achieved, especially in file systems where multiple files share a large amount of identical data. How to locate these previously stored data segments are discussed in more detail below. Further, data segments that have not been previously stored on the replicated file system are located and replicated on the replicated file system. It is possible in some situations that all the data segments included in the file have been previously stored on the replicated file system therefore no additional replication is necessary. It is also possible that there is no previously stored data segment and all the data segments in the file need to be replicated.

In some embodiments, a log record is used to track the file system operations, recording file updates as they occur. Depending on implementation, the entries in the log record may include segment references, content handles, metadata, and other information that can be used for executing operations to synchronize the replicated file system with the original file system. There are a number of ways a log entry is generated, including every time an event (such as file write) occurs, after several events occur, or at a predetermined frequency. In some embodiments, to capture more update information with fewer log entries, each log entry is generated only when a key event occurs, such as when a file closes, after a predetermined idle period has lapsed, when a snapshot of the file system is created, etc. During replication, the log record is processed, and updated files are determined based on log entries indicating file update operations such as file modification, file creation, etc.

In some embodiments, a snapshot is taken immediately before a replication starts. The snapshot records information of the file system at a point in time. It may be a snapshot of the entire file system, or a snapshot of one or more individual files. The snapshot may include information such as data segment references, content handles, etc. In some embodiments, prior to the next replication operation, the current states of the system are compared to a snapshot of the system to determine which files have been updated. In some embodiments, the current states of a file are compared to a snapshot of the file to determine whether the file has been updated.

In processing data segments, there are a number of ways to locate data segments that have not been stored previously on the replicated file system, some of which are described below although any other appropriate technique may be used. In some embodiments, log records are used. Log entries record operations on the original file system. In some embodiments, when a file is updated, a log entry including information about the file's data segment references is created. Offsets of the new data segment references, and other information that may assist in file replication are also recorded as appropriate. During replication, based on the log records of the new data segment references, it is determined whether the data segment being referenced has been stored already.

In some embodiments, upon receiving a query, the data segment reference on the replicated file system is looked up by the replicator or the replicated file system in a database of stored data segment identifiers, to determine whether such a data segment has been stored previously, and provides a response based on the lookup result. In some embodiments, the data segment reference under evaluation is compared with the data segment references known at the time of last replication. The comparison can be carried out by the original file system or by the replicator. If the data segment reference can be found in existing data segment references, it indicates that the corresponding data segment has already been stored. Else, the corresponding data segment may not have been stored and may need to be replicated. In some embodiments, all such segments are replicated. In other embodiments, a query of the replicator or replicated file system determines whether the segment is replicated or not as described above. In all cases, many segments are not replicated even though new references to those segments are. Thus, the available bandwidth of the storage systems and the network connecting them is more efficiently utilized.

In some embodiments, when a file is updated, a log entry including information about the file's content handle is created. In some embodiments, to reduce the amount of processing, a log entry including content handle information is created after multiple updates, or upon certain key event such as when a file is closed. The content handle indirectly references the data segments included in the file and may be analyzed to obtain data segment references.

A file system includes one or more file system blocks. Some of the file system blocks are data blocks, some file system blocks may be indirect block, as described above, or some file system blocks are free blocks that have not yet been allocated to any file in the file system. In an indirect mapping protocol, such as the conventional indirect mapping protocol of a UNIX-based file system, the indirect mapping protocol permits any free block of the file system to be allocated to a file of the file system and mapped to any logical block of a logical extent of the file. This unrestricted mapping ability of the conventional indirect mapping protocol of a UNIX-based file system is a result of the fact that metadata for each file includes a respective pointer to each data block of the file of the file system, as described below.

Figure 2:
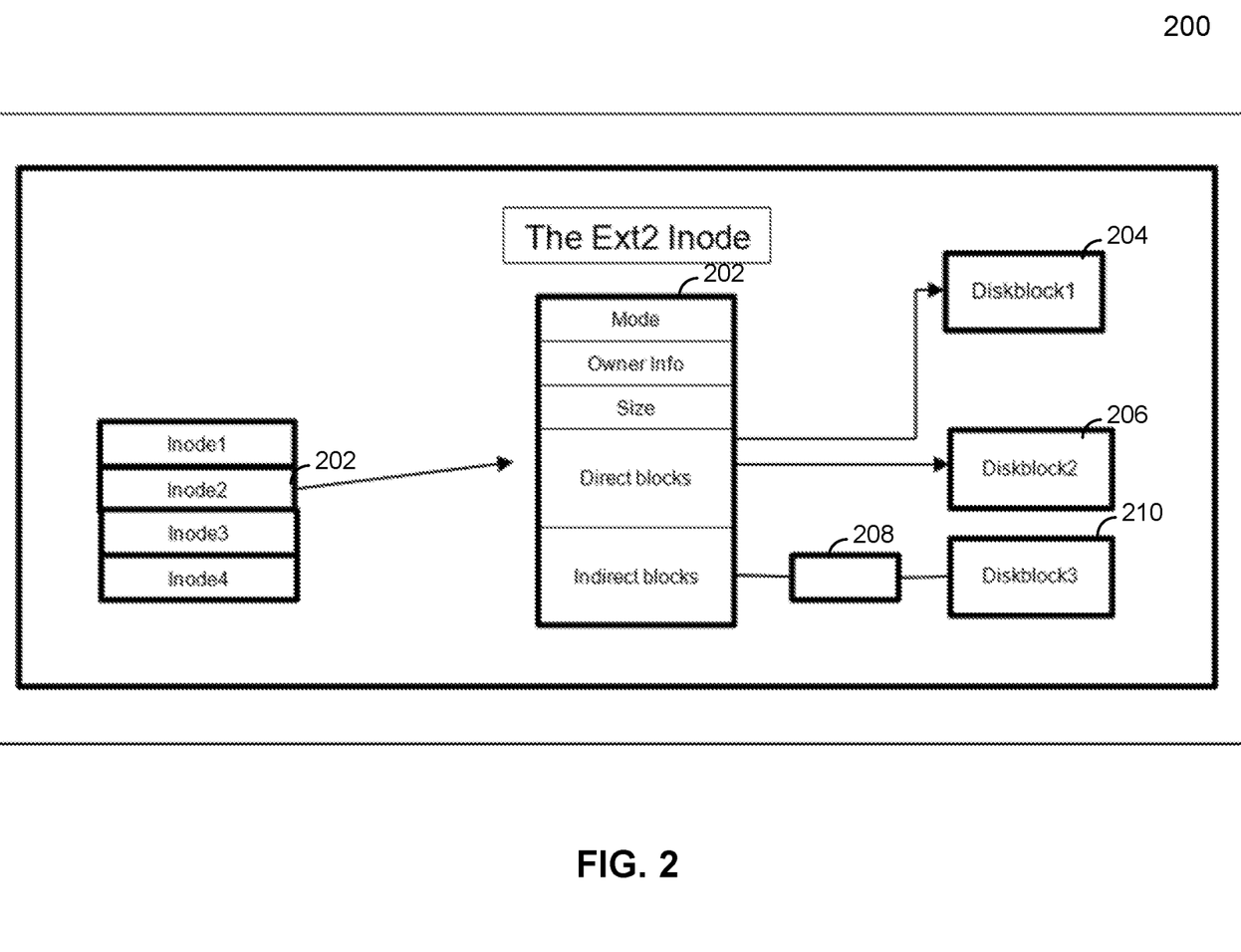
FIG. 2 is a block diagram illustrating the use of the inode in the second extended (ext2) file system.

Referring to FIG. 2, a block diagram 200 illustrating the use of the inode in the second extended (ext2) file system is shown. File systems keep metadata regarding each file location, which may be achieved using the index node (inode). An inode corresponding to a file may store, among other things, pointers to the actual disk blocks on which the file is written. Therefore, the metadata enables a translation between the file space and the actual disk locations. In different embodiments, other file system location mapping schema than the inode may also be utilized.

Each file of the file system includes an index node (inode) (e.g., inode 2 202) containing attributes of the file and a block pointer array containing pointers to data blocks of the file. There is one inode for each file in the file system. Each inode can be identified by an inode number. Several inodes may fit into one of the file system blocks. The inode number can be easily translated into a block number and an offset of the inode from the start of the block. Each inode of a file contains metadata of the file. Some block pointers of a file point directly at data blocks (e.g., disk block 1 204 or disk block 2 206), other block pointers of the file points at blocks of more pointers, known as an indirect block (e.g., block 208).

There are at least fifteen block pointer entries in a block pointer array contained in an inode (e.g., inode 2 202) of a file. The first of up to twelve entries of block pointers in the inode directly point to the first of up to twelve data blocks (e.g., disk block 1 204 or disk block 2 206) of the file. If the file contains more than twelve data blocks, then the thirteenth entry of the block pointer array contains an indirect block pointer pointing to an indirect block (e.g., block 208) containing pointers to one or more additional data blocks (e.g., disk block 3 210). If the file contains so many data blocks that the indirect block becomes full of block pointers, then the fourteenth entry of the block pointer array contains a double indirect block pointer to an indirect block that itself points to an indirect block that points to one or more additional data blocks. If the file is so large that the indirect block becomes full of block pointers and its descendant indirect blocks are also full of block pointers, then the fifteenth entry of the block pointer array includes another level of indirection where the block pointer entry contains a triple indirect block pointer to an indirect block that points to an indirect block that points to an indirect block that points to one or more additional data blocks. Similarly there exists fourth and fifth level of indirections. Once the indirect blocks at last level of indirection and its descendant indirect blocks become full of pointers, the file contains a maximum permitted number of data blocks. Further, an indirect block at the last level of indirection is also referred to as a leaf indirect block.

The following definitions are employed throughout the specification and claims.

A backup site may be a facility where replicated production site data is stored; the backup site may be located in a remote site or at the same location as the production site.

A Data Protection Appliance (DPA), or alternatively and interchangeably, a Replication Protection Appliance (RPA), may be a computer or a cluster of computers, or a set of processes that serve as a data protection appliance, and may be responsible for data protection services including inter alia data replication of a storage system, and journaling of I/O requests issued by a host computer to the storage system.

A journal may be a record of write transactions issued to a storage system; it is used to maintain a duplicate storage system, and to enable rolling back of the duplicate storage system to a previous point in time.

A logical unit may be a logical entity provided by a storage system for accessing data from the storage system.

A source side may be a transmitter of data within a data replication workflow. During normal operation a production site is the source side; and during data recovery a backup site is the source side.

A target side may be a receiver of data within a data replication workflow. During normal operation a backup site is the target side, and during data recovery a production site is the target side.

A splitter may be an agent running either on a production host, a switch, or a storage array which can intercept Inputs/Outputs (I/O) and split them to a DPA/RPA and to the storage array, fail I/O, redirect I/O, or do any other manipulation to the I/O.

The marking on splitter may be a mode in a splitter where intercepted I/Os are not split to an appliance and the storage, but changes (metadata) are tracked in a list and/or a bitmap and I/O is immediately sent down to the I/O stack.

Figure 3:
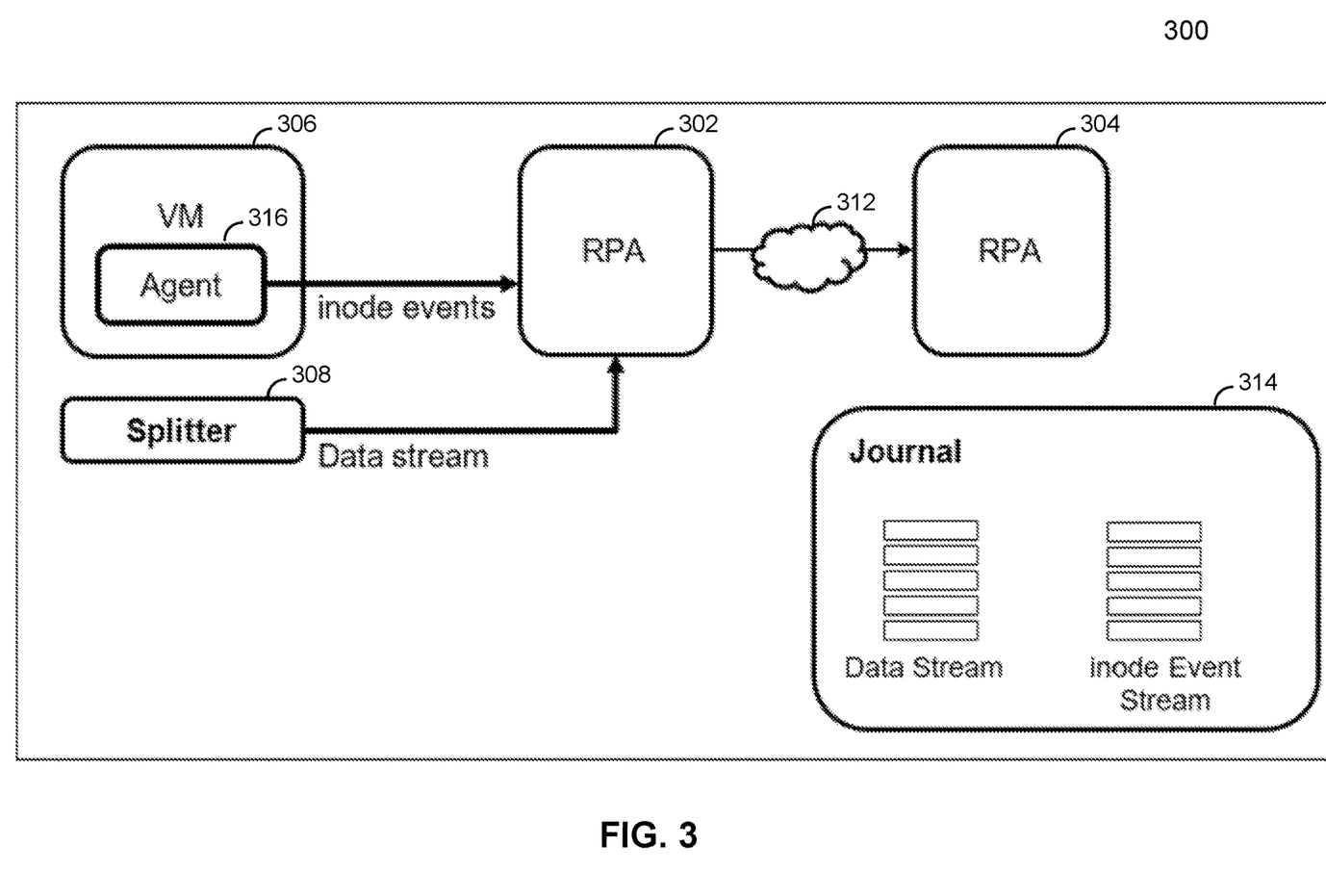
FIG. 3 is a block diagram illustrating various components usable in implementation of embodiments of the disclosure.

Referring to FIG. 3, a block diagram 300 illustrating various components usable in implementation of embodiments of the disclosure is shown. The environment includes two replication protection appliances (RPAs), a source side RPA 302 and a target side RPA 304. An RPA performs various data protection services, such as data replication of a storage system, and journaling of I/O requests issued by a host computer to source side storage system data. When acting as a target side RPA, a RPA may also enable rollback of data to an earlier PiT, and processing of rolled back data at the target site. Each RPA 302 and 324 is either a physical computer that includes inter alia one or more conventional CPUs and internal memory or a virtual machine.

A VM 306 may be running on a source side host computer (not shown). The VM image may be stored either at the host computer or in a separate storage system. Therefore, RPA 302 and RPA 304 may enable local, remote and concurrent local and remote replication with continuous data protection for recovery of VMs to any PiT, wherein a journal-based implementation holds the PiT information of all changes made to the protected data.

Although RPA 302 and RPA 304 are illustrated as being standalone devices, in different embodiments, they may be integrated into storage systems, or integrated into host computers. Both RPAs communicate with their respective host computers through communication lines such as fiber channels using, for example, SCSI commands.

In accordance with an embodiment of the present disclosure, the host computer on the source side includes a splitter 308. The splitter 308 may intercept SCSI commands issued by the host computer, via a host device to a logical unit that is accessible to the host computer. In accordance with an embodiment of the present disclosure, The splitter 308 may act on an intercepted SCSI commands issued to a logical unit, in one of the following ways:

Send the SCSI commands to its intended logical unit.
Redirect the SCSI command to another logical unit.

Split the SCSI command by sending it first to the respective RPA. After the RPA returns an acknowledgement, send the SCSI command to its intended logical unit.

Fail a SCSI command by returning an error return code.

Delay a SCSI command by not returning an acknowledgement to the host computer.

The splitter 308 may handle different SCSI commands, differently, according to the type of the command. For example, a SCSI command inquiring about the size of a certain logical unit may be sent directly to that logical unit, while a SCSI write command may be split and sent first to the RPA 302. The splitter 308 may also change its behavior for handling SCSI commands, for example as a result of an instruction received from the RPA 302.

Specifically, the behavior of the splitter 308 generally corresponds to the behavior of its associated RPA 302 with respect to the logical unit of the host device. When an RPA behaves as a source site RPA for a certain logical unit, then during normal course of operation, the associated splitter 308 splits I/O requests issued by a host computer to the host device corresponding to that logical unit. Similarly, when an RPA behaves as a target device for a certain logical unit, then during normal course of operation, the associated splitter fails I/O requests issued by host computer to the host device corresponding to that logical unit.

Communication between the splitter 308 and the RPA 302 may use any suitable protocol, such as fiber channel, or SCSI over fiber channel. The communication may be direct, or via a logical unit exposed by the RPA.

In an embodiment of the present disclosure, the splitter 308 may be a driver located in the host computer. Alternatively, the splitter 308 may also be located in a fiber channel switch, or in any other device situated in a data path between a host computer and a storage system.

In accordance with an embodiment of the present disclosure, in production mode RPA 302 acts as a source site RPA. Thus, the splitter 308 is configured to act as a source side splitter. Specifically, the splitter 308 replicates SCSI I/O requests. A replicated SCSI I/O request is sent to RPA 302. After receiving an acknowledgement from RPA 304, the splitter 308 then sends the SCSI I/O request to the relevant logical unit. Only after receiving a second acknowledgement from the storage system may the host computer initiate another I/O request.

When RPA 302 receives a replicated SCSI write request from the splitter 308, RPA 302 transmits certain I/O information characterizing the write request, packaged as a "write transaction", over a communication channel 312 (e.g., a local area network "LAN" or a wide area network "WAN") to RPA 304 on the target side, for journaling and for incorporation within target storage system.

While in production mode, RPA 304 receives replicated data stream from RPA 302, and performs journaling and writing to the target side storage system. When applying write operations to the target storage system, RPA 304 acts as an initiator.

During a recovery mode, RPA 304 may undo the write transactions in the journal, so as to restore the production side storage system to the state it was at, at an earlier time. RPA 304 may include a journal processor for managing the journal 314.

Therefore, the two RPAs 302, 304, the splitter 308, and the data stream which comprise the write transactions (or simply "writes") stored in the journal 314 enable the conventional PiT replication and restoration of the VM 306.

In one embodiment, to enable file level PiT replication and restoration, the protected VM 306 further includes a file system agent 316. The file system agent 316 may monitor changes in the inode information in the file system of the VM 306. Each change in the inode information may be referred to as an inode event. While in production mode, the file system agent 316 may capture the inode events and stream the captured inode events to the backup site for journaling via the RPA 302 and the RPA 304.

The RPA 304 may store, in addition to the data stream, a stream that contains the inode events to the journal 314.

The inode event stream may comprise the relevant information from the inode subtree in the file system, e.g., the metadata stored in the inodes including the pointers to the disk blocks that contain the file data. The inode data is small, yet it represents the whole view of the file block locations at a specific PiT. Changes in the inode information relates to changes in the file system. It should be appreciated that when storing inode change information relating to delete directory operations, not only the "undo" information of that directory needs to be stored, but also that of its children. In other words, in order to enable the reversion of a directory deletion, the undo information for the whole directory (sub-)tree needs to be stored.

In one embodiment, after an inode event is captured, the full updated inode information is sent to the backup site for journaling. In another embodiment, after an inode event is captured, only the change in the inode information is sent to the backup site for journaling.

The RPA 302 may send to the backup site inode events alongside the write transactions. The RPA 304 stores the inode events in the journal 314 in a separate inode event stream from the data stream. The file system agent 316 may scan and retrieve all the inodes during an initialization phase or when there is a suspicion that some inode events may have been lost, and the full inode structure may be sent in the inode event stream to the backup site for journaling.

Therefore, for any PiT, the RPA 304 may obtain the corresponding inode structure, if not directly available, based on the journaled inode event stream, which may include the initial and/or earlier inode structure, by rolling forward the initial/earlier inode structure. In another embodiment, obtaining the inode structure corresponding to a particular PiT for which the full inode structure is not directly available based on the inode event stream may comprise rolling back a later inode structure to the particular PiT.

Figure 4:
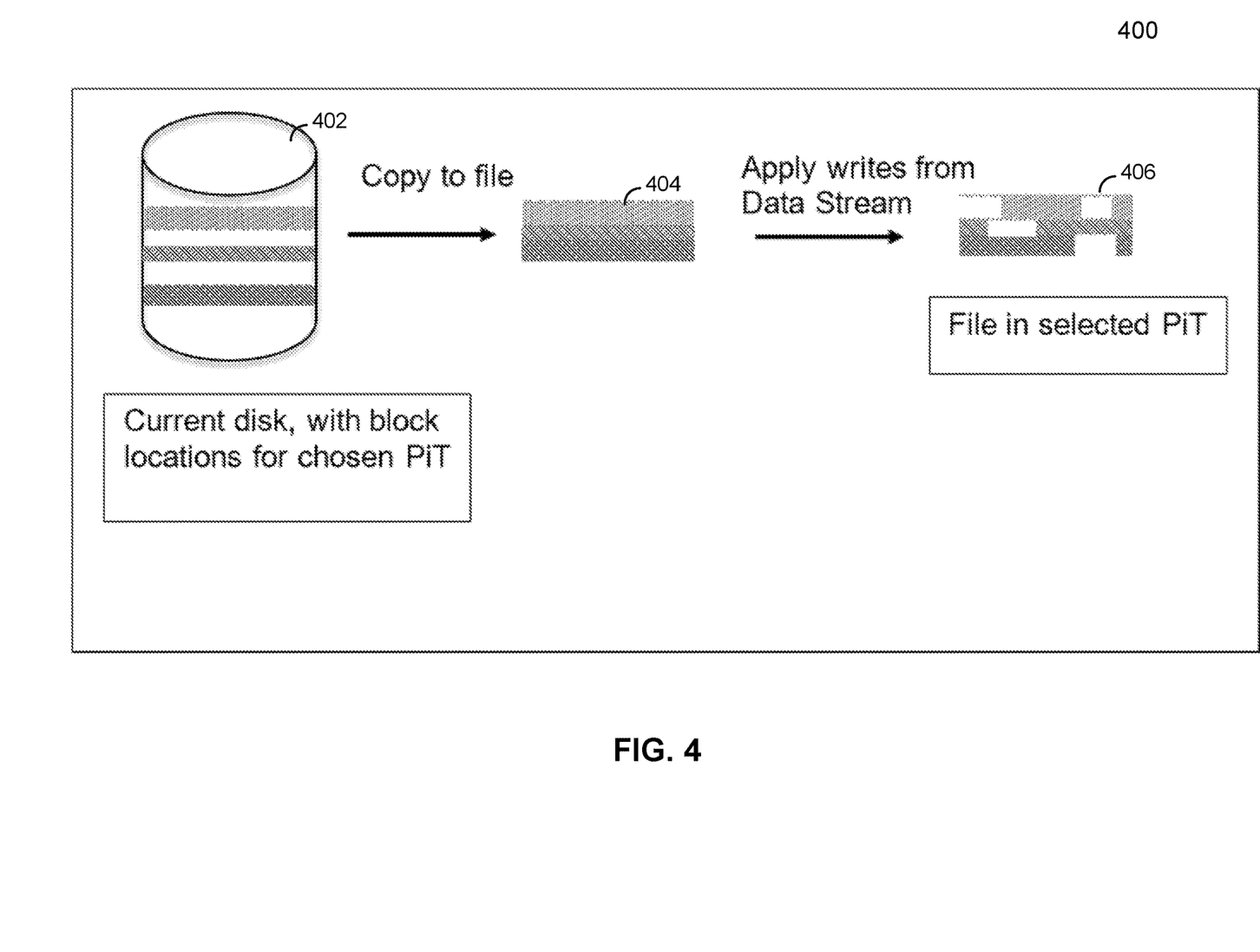
FIG. 4 is a block diagram illustrating an example method for restoring a file corresponding to a particular PiT according to one embodiment.

Referring to FIG. 4, a block diagram illustrating an example method 400 for restoring a file corresponding to a particular PiT according to one embodiment is shown. With the assistance of the inode event stream stored in the journal 314, an individual file corresponding to a particular PiT may be restored. To restore a file corresponding to a particular PiT, the particular PiT and the name of the file to be restored may be received from the user. Next, the full inode information corresponding to the particular PiT may be reconstructed using the inode event stream stored in the journal 314. The reconstruction may comprise rolling the inode events, either back or forward, to the particular PiT.

After obtaining the full inode information corresponding to the particular PiT, the disk locations for the file to be restored that corresponds to the particular PiT may be determined based on the full inode information. In the storage system (or a logical unit thereof) 402 of the backup site, the data stored at the disk locations may be read, and may be assembled into a temporary file 404. It should be appreciated that because the data retrieved from the storage system corresponds to a current time, the temporary file 404 is not the same as the desired file that corresponds to the particular PiT.

To obtain the file corresponding to the particular PiT, the data stream stored in the journal 314 may be used to roll back the data of the temporary file 404 from the current time to the particular PiT. The data rollback may comprise reversing/undoing the relevant writes performed between the particular PiT and the current time, and may be performed quickly as writes in the data stream that are not relevant to the file to be restored can be filtered out and ignored. It should be appreciated that that each block in the temporary file corresponds to a disk location on the storage system. The relevant writes to be reversed are specified in the journaled data stream with disk locations. Therefore, to reverse the writes in the temporary file, there is a need to map disk locations to the correct area in the temporary file. The determination of the mapping is straightforward as there is a one-to-one mapping.

After the data rollback is complete, the temporary file is transformed into the desired file 406 corresponding to the particular PiT. In one embodiment, the user may directly download the restored file 406. In another embodiment, the restored file 406 may be automatically copied to the VM 306 at the production site to restore the system.

Figure 5:
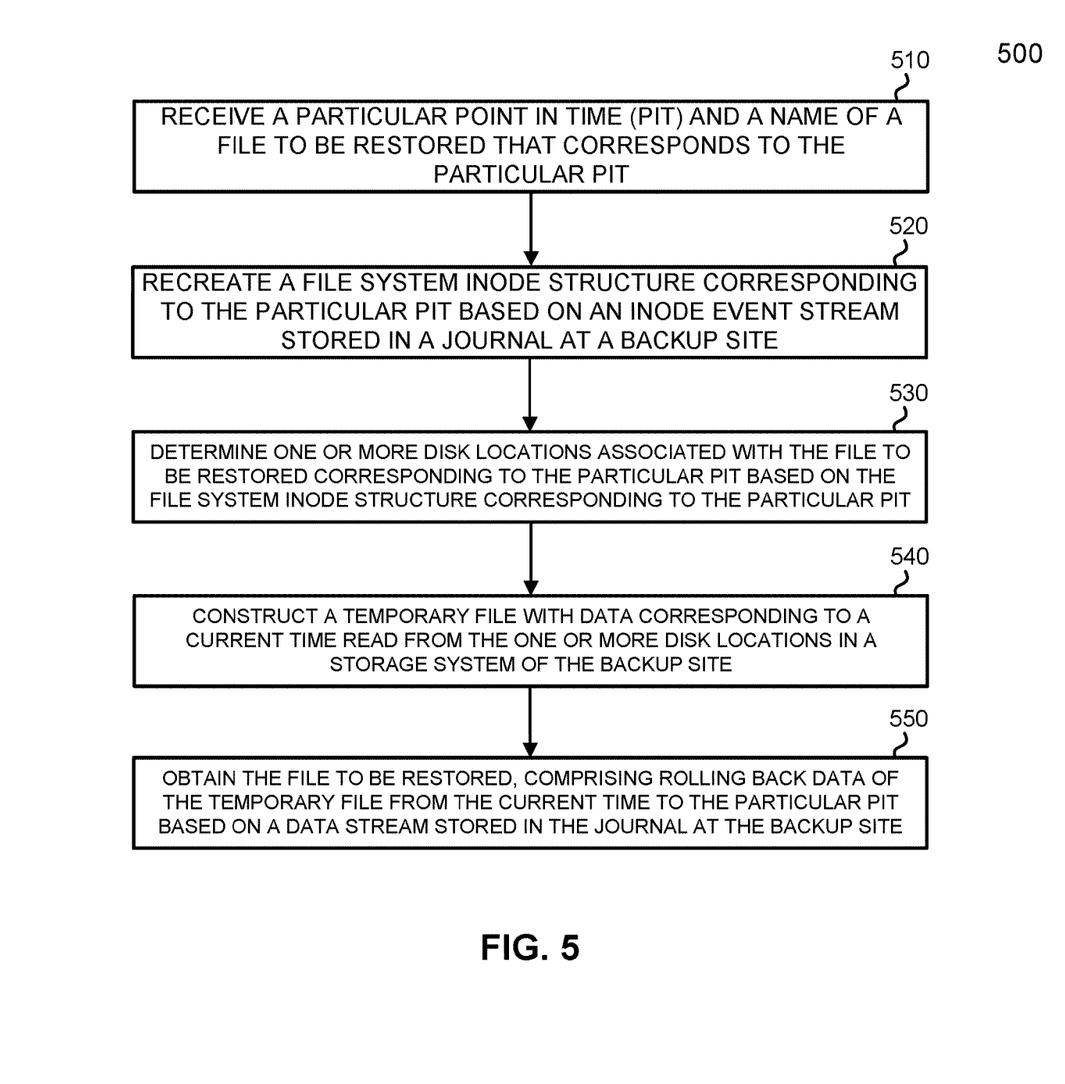
FIG. 5 is a flowchart illustrating an example method for restoring a file corresponding to a particular PiT according to one embodiment.

Referring to FIG. 5, a flowchart illustrating an example method 500 for restoring a file corresponding to a particular PiT according to one embodiment is shown. Process 500 may be performed by processing logic that includes hardware (e.g. circuitry, dedicated logic, etc.), software (e.g., embodied on a non-transitory computer readable medium), or a combination thereof. For example, process 500 may be performed by processor 1501 of FIG. 6. At block 510, the particular PiT and a name of the file to be restored that corresponds to the particular PiT may be received (e.g., from a user). At block 520, a file system inode structure corresponding to the particular PiT may be recreated based on an inode event stream stored in a journal at a backup site. At block 530, one or more disk locations associated with the file to be restored corresponding to the particular PiT may be determined based on the file system inode structure corresponding to the particular PiT. At block 540, a temporary file may be constructed with data corresponding to a current time read from the one or more disk locations in a storage system of the backup site. At block 550, the file to be restored may be obtained, which may comprise rolling back data of the temporary file from the current time to the particular PiT based on a data stream stored in the journal at the backup site.

In one embodiment, the inode event stream stored in the journal at the backup site may comprise a plurality of inode events captured by a file system agent in a virtual machine (VM) at a production site and transmitted over time from the production site to the backup site for journaling.

In one embodiment, the data stream stored in the journal at the backup site may comprise a plurality of storage data writes captured by a splitter at the production site and transmitted over time from the production site to the backup site for backup storage and journaling.

In one embodiment, the inode event stream may comprise one or more file system inode structures corresponding to past PiTs.

In one embodiment, recreating the file system inode structure corresponding to the particular PiT based on the inode event stream may comprise rolling forward a file system inode structure corresponding to an earlier PiT to the particular PiT. In one embodiment, the file system inode structure corresponding to the earlier PiT may be an initial file system inode structure.

In one embodiment, recreating the file system inode structure corresponding to the particular PiT based on the inode event stream may comprise rolling back a file system inode structure corresponding to a later PiT to the particular PiT.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 6:
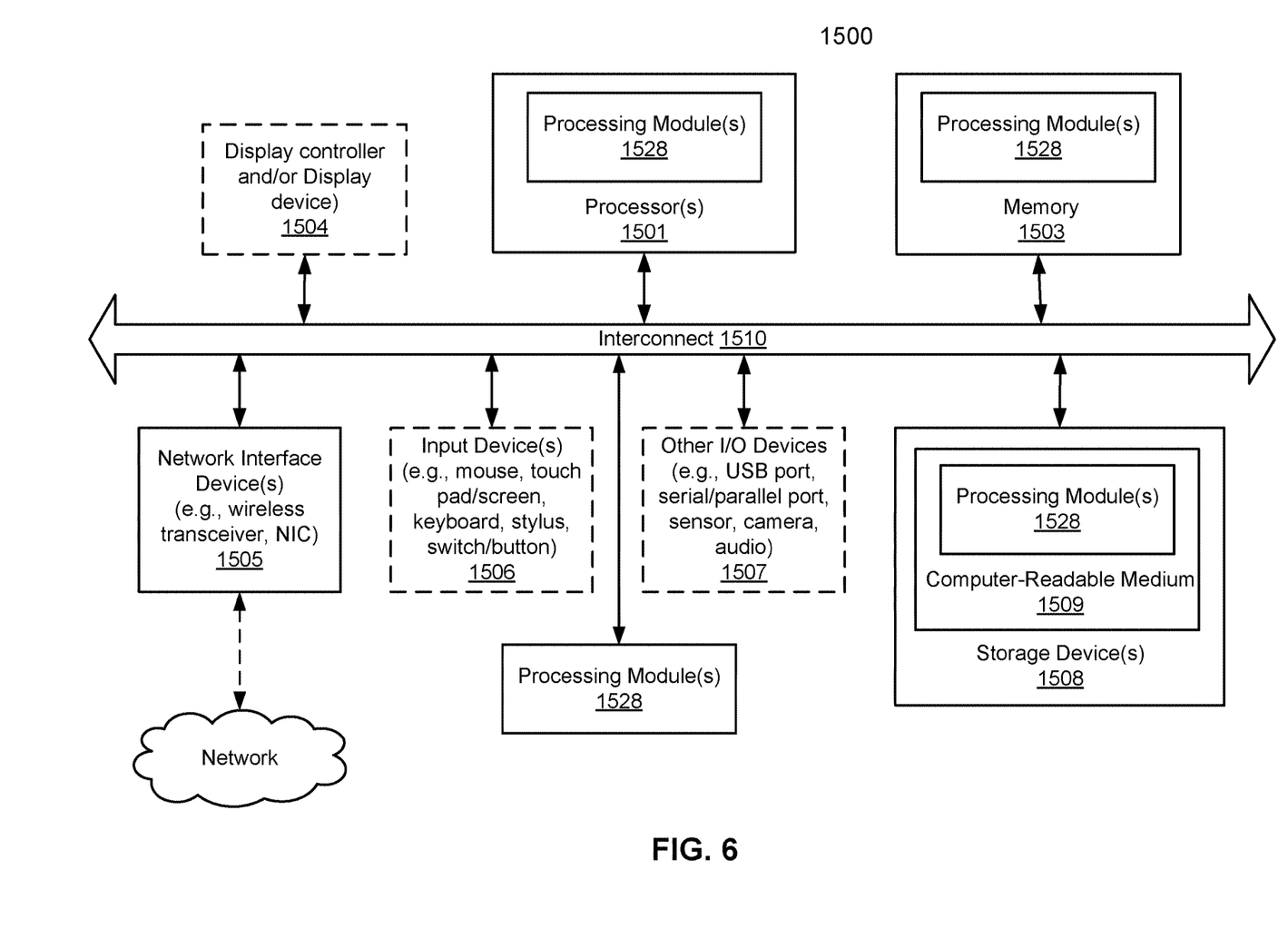
FIG. 6 is a block diagram illustrating a data processing system according to one embodiment.

FIG. 6 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, a storage service logic, a deduplication engine, a journal processor, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the invention.

Therefore, embodiments of the disclosure relate to a method to efficiently recreate a single or several files corresponding to a particular PiT. A smart file system agent in the VM that is integrated with RPA system is utilized to make available the data necessary for the process. Accordingly, the overall user experience when a file gets lost or corrupted and needs to be restored is improved.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
receiving a particular point in time (PiT) and a name of a file to be restored that corresponds to the particular PiT;
recreating a file system inode structure corresponding to the particular PiT based on an inode event stream stored in a journal at a backup site;
determining one or more disk locations associated with the file to be restored corresponding to the particular PiT based on the file system inode structure corresponding to the particular PiT;
constructing a temporary file with data corresponding to a current time read from the one or more disk locations in a storage system of the backup site; and
obtaining the file to be restored, comprising rolling back data of the temporary file from the current time to the particular PiT based on a data stream stored in the journal at the backup site.

2. The method of claim 1, wherein the inode event stream stored in the journal at the backup site comprises a plurality of inode events captured by a file system agent in a virtual machine (VM) at a production site and transmitted over time from the production site to the backup site for journaling.

3. The method of claim 1, wherein the data stream stored in the journal at the backup site comprises a plurality of storage data writes captured by a splitter at the production site and transmitted over time from the production site to the backup site for backup storage and journaling.

4. The method of claim 1, wherein the inode event stream comprises one or more file system inode structures corresponding to past PiTs.

5. The method of claim 1, wherein recreating the file system inode structure corresponding to the particular PiT based on the inode event stream comprises rolling forward a file system inode structure corresponding to an earlier PiT to the particular PiT.

6. The method of claim 5, wherein the file system inode structure corresponding to the earlier PiT is an initial file system inode structure.

7. The method of claim 1, wherein recreating the file system inode structure corresponding to the particular PiT based on the inode event stream comprises rolling back a file system inode structure corresponding to a later PiT to the particular PiT.

8. A non-transitory machine-readable medium having instructions stored therein, which when executed by a processor, cause the processor to perform data restoration operations, the operations comprising:
receiving a particular point in time (PiT) and a name of a file to be restored that corresponds to the particular PiT;

recreating a file system inode structure corresponding to the particular PiT based on an inode event stream stored in a journal at a backup site;

determining one or more disk locations associated with the file to be restored corresponding to the particular PiT based on the file system inode structure corresponding to the particular PiT;

constructing a temporary file with data corresponding to a current time read from the one or more disk locations in a storage system of the backup site; and obtaining the file to be restored, comprising rolling back data of the temporary file from the current time to the particular PiT based on a data stream stored in the journal at the backup site.

9. The non-transitory machine-readable medium of claim 8, wherein the inode event stream stored in the journal at the backup site comprises a plurality of inode events captured by a file system agent in a virtual machine (VM) at a production site and transmitted over time from the production site to the backup site for journaling.

10. The non-transitory machine-readable medium of claim 8, wherein the data stream stored in the journal at the backup site comprises a plurality of storage data writes captured by a splitter at the production site and transmitted over time from the production site to the backup site for backup storage and journaling.

11. The non-transitory machine-readable medium of claim 8, wherein the inode event stream comprises one or more file system inode structures corresponding to past PiTs.

12. The non-transitory machine-readable medium of claim 8, wherein recreating the file system inode structure corresponding to the particular PiT based on the inode event stream comprises rolling forward a file system inode structure corresponding to an earlier PiT to the particular PiT.

13. The non-transitory machine-readable medium of claim 12, wherein the file system inode structure corresponding to the earlier PiT is an initial file system inode structure.

14. The non-transitory machine-readable medium of claim 8, wherein recreating the file system inode structure corresponding to the particular PiT based on the inode event stream comprises rolling back a file system inode structure corresponding to a later PiT to the particular PiT.

15. A data processing system, comprising:
a processor; and
a memory coupled to the processor to store instructions, which when executed by the processor, cause the processor to perform data restoration operations, the operations including:

receiving a particular point in time (PiT) and a name of a file to be restored that corresponds to the particular PiT;

recreating a file system inode structure corresponding to the particular PiT based on an inode event stream stored in a journal at a backup site;

determining one or more disk locations associated with the file to be restored corresponding to the particular PiT based on the file system inode structure corresponding to the particular PiT;

constructing a temporary file with data corresponding to a current time read from the one or more disk locations in a storage system of the backup site; and obtaining the file to be restored, comprising rolling back data of the temporary file from the current time to the particular PiT based on a data stream stored in the journal at the backup site.

16. The data processing system of claim 15, wherein the inode event stream stored in the journal at the backup site comprises a plurality of inode events captured by a file system agent in a virtual machine (VM) at a production site and transmitted over time from the production site to the backup site for journaling.

17. The data processing system of claim 15, wherein the data stream stored in the journal at the backup site comprises a plurality of storage data writes captured by a splitter at the production site and transmitted over time from the production site to the backup site for backup storage and journaling.

18. The data processing system of claim 15, wherein the inode event stream comprises one or more file system inode structures corresponding to past PiTs.

19. The data processing system of claim 15, wherein recreating the file system inode structure corresponding to the particular PiT based on the inode event stream comprises rolling forward a file system inode structure corresponding to an earlier PiT to the particular PiT.

20. The data processing system of claim 19, wherein the file system inode structure corresponding to the earlier PiT is an initial file system inode structure.

21. The data processing system of claim 15, wherein recreating the file system inode structure corresponding to the particular PiT based on the inode event stream comprises rolling back a file system inode structure corresponding to a later PiT to the particular PiT.

* * * * *